US008774866B1

(12) United States Patent
Anderson et al.

(10) Patent No.: US 8,774,866 B1
(45) Date of Patent: Jul. 8, 2014

(54) ELECTRICALLY FLOATING, NEAR VERTICAL INCIDENCE, SKYWAVE ANTENNA

(75) Inventors: Allen A. Anderson, Firth, ID (US);
Timothy G. Kaser, Ammon, ID (US);
Paul A. Tremblay, Idaho Falls, ID (US);
Randall A. Mays, Fresno, CA (US);
Belva L. Mays, legal representative, Fresno, CA (US)

(73) Assignee: United States Department of Energy, Washington, DC (US)

( * ) Notice: Subject to any disclaimer, the term of this patent is extended or adjusted under 35 U.S.C. 154(b) by 441 days.

(21) Appl. No.: 13/239,470

(22) Filed: Sep. 22, 2011

(51) Int. Cl.
*H04M 1/00* (2006.01)
*H01Q 1/14* (2006.01)
*H04W 16/28* (2009.01)

(52) U.S. Cl.
CPC *H01Q 1/14* (2013.01); *H04W 16/28* (2013.01)
USPC .............. 455/562.1; 455/575.7; 455/550.1; 455/97; 455/121; 343/700 MS; 343/702; 343/713

(58) Field of Classification Search
CPC ......... H01Q 1/38; H01Q 9/0407; H01Q 1/32; H01Q 1/40; H01Q 5/0062; H01Q 9/42; H01Q 1/2216; H01Q 1/2225; H01Q 21/065; H01Q 21/28; F41H 5/02; F41H 5/0414; F41H 5/0428; H04L 1/0618
USPC ........... 455/562.1, 25, 63.4, 575.7, 121, 274, 455/269, 286, 339, 340, 55.1, 6.1, 550.1; 375/267; 343/700, 789, 846, 837, 912, 343/713, 702, 848, 893, 860, 905, 850
See application file for complete search history.

(56) References Cited

U.S. PATENT DOCUMENTS

| | | | | |
|---|---|---|---|---|
| 5,721,662 A * | 2/1998 | Glaser et al. | ................... | 361/119 |
| 2002/0044099 A1* | 4/2002 | Yamamoto et al. | ............ | 343/789 |
| 2004/0056811 A1* | 3/2004 | Pakray et al. | ................. | 343/713 |
| 2005/0220207 A1* | 10/2005 | Perlman et al. | ............... | 375/267 |
| 2007/0069957 A1* | 3/2007 | Ranta | ..................... | 343/700 MS |
| 2009/0213012 A1* | 8/2009 | Jiang et al. | ............. | 343/700 MS |
| 2009/0295645 A1* | 12/2009 | Campero et al. | ....... | 343/700 MS |
| 2011/0095955 A1* | 4/2011 | Cohen | ........................... | 343/837 |
| 2011/0260935 A1* | 10/2011 | Bortoin et al. | ................ | 343/713 |
| 2011/0263289 A1* | 10/2011 | Vance | ......................... | 455/550.1 |
| 2011/0273360 A1* | 11/2011 | Campero et al. | .............. | 343/893 |
| 2012/0038520 A1* | 2/2012 | Cornwell | ...................... | 343/702 |
| 2012/0299778 A1* | 11/2012 | Yen et al. | ............. | 343/700 MS |

\* cited by examiner

*Primary Examiner* — Tan Trinh
(74) *Attorney, Agent, or Firm* — Michael J. Dobbs; Daniel D. Park; John T. Lucas

(57) ABSTRACT

An Electrically Floating, Near Vertical Incidence, Skywave (NVIS) Antenna comprising an antenna element, a floating ground element, and a grounding element. At least part of said floating ground element is positioned between said antenna element and said grounding element. The antenna is separated from the floating ground element and the grounding element by one or more electrical insulators. The floating ground element is separated from said antenna and said grounding element by one or more electrical insulators.

17 Claims, 4 Drawing Sheets

ELECTRICALLY FLOATING, NEAR VERTICAL INCIDENCE, SKYWAVE ANTENNA

GOVERNMENT INTERESTS

The United States Government has rights in this invention pursuant to Contract No. DE-AC07-05ID14517, between the U.S. Department of Energy (DOE) and the Battelle Energy Alliance.

CROSS-REFERENCE TO RELATED APPLICATIONS

1. Field of the Invention

The present invention relates to an Electrically Floating, Near Vertical Incidence, Skywave (NVIS) Antenna.

2. Background of the Invention

Radio transmission and reception is an important technology for any modern civilization, particularly in times of emergency or war. Near Vertical Incidence Skywave (NVIS) is a radio-wave propagation technique in which a radio signal is transmitted straight-up into the ionosphere. The signal refracts off the ionosphere downward around the area surrounding the transmitter. This method is particularly useful in situations where surrounding structures (e.g. mountains, walls, buildings, etc.) may block line-of-site radio-waves.

Generally, a Near Vertical Incidence Skywave (NVIS) Antenna NVIS antenna configuration has an antenna wire about five feet above ground running parallel with the ground. The proximity to the ground forces the majority of the radiation emitting out of the antenna to emit in the upward direction into the ionosphere. A ground wire slightly longer than the antenna, running parallel to, and positioned directly underneath the antenna is used to increase the efficiency of the antenna by about 3 dB to 6 dB. The ground wire is electrically connected to the ground at all frequencies by one or more electrically conductive stakes in the ground.

Improved antenna efficiency allows for longer range transmissions, lower power consumption, small/lighter components, combinations thereof etc. Therefore, the prospect of an improved antenna design offering increased efficiency and range is highly desirable.

SUMMARY OF THE INVENTION

An Electrically Floating, Near Vertical Incidence, Skywave (NVIS) Antenna comprising an antenna element, a floating ground element, and a grounding element. The floating ground element is electrically insulated from electrical ground at least at one or more communications frequencies. The grounding element is electrical ground or electrically connected to electrical ground at least at one or more communications frequencies, preferably at all frequencies. At least part of the floating ground element is positioned between the antenna element and the grounding element. Preferably, the floating ground element has a surface area larger than the surface area of the antenna element. The antenna element is separated from the floating ground element and the grounding element by one or more electrical insulators. The floating ground element is separated from the antenna and the grounding element by one or more electrical insulators.

DETAILED DESCRIPTION OF THE INVENTION

Figure 1:
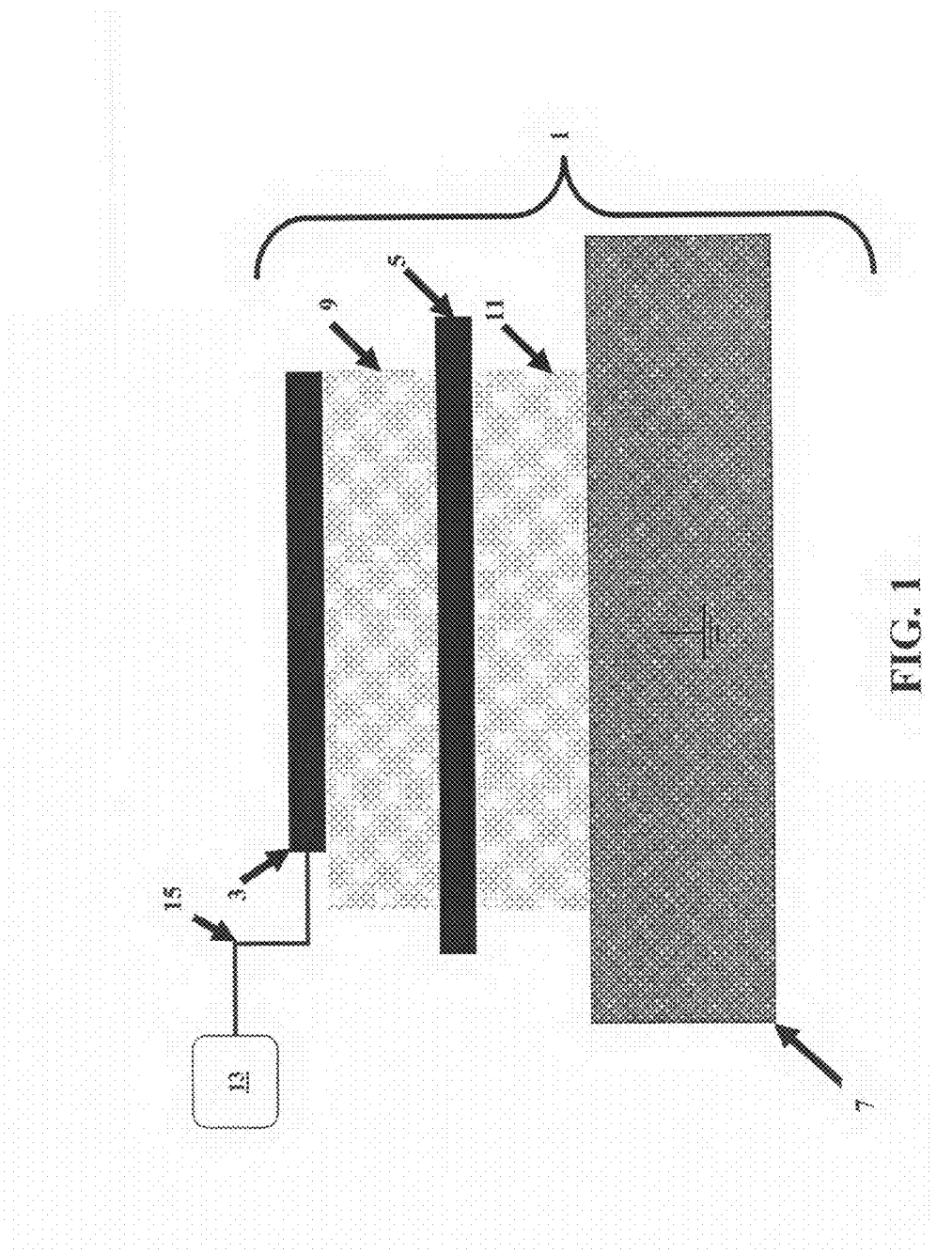
FIG. 1 is a side view of one embodiment of an electrically floating, near vertical incident, Skywave (NVIS) Antenna.

An Electrically Floating, Near Vertical Incidence, Skywave (NVIS) Antenna comprising an antenna element, a floating ground element, and a grounding element. The floating ground element is electrically insulated from electrical ground at least at one or more communications frequencies. The grounding element is electrical ground or electrically connected to electrical ground at least at one or more communications frequencies, preferably at all frequencies. At least part of the floating ground element is positioned between the antenna element and the grounding element. Preferably, the floating ground element has a surface area larger than the surface area of the antenna element. The antenna element is separated from the floating ground element and the grounding element by one or more electrical insulators. The floating ground element is separated from the antenna and the grounding element by one or more electrical insulators.

Floating Ground Element

The floating ground element is any electrically conductive device electrically insulated from ground at least at one or more communications frequencies. For example, at a preferred one or more communications frequencies, between 1-60 Mhz, the floating ground element is electrically insulated from ground.

Preferably, the floating ground element is designed to have a resonant frequency about 5% lower than the antenna element, thereby allowing the floating ground element to aid in reflecting the RF energy into the sky. Preferably, the floating ground element is designed to have a resonant frequency about 5% lower than the antenna element by designing the floating ground element to be longer than the antenna element. In the alternative, the floating ground element is designed to have a resonant frequency equal to or higher than the antenna element, thereby allowing the floating ground element aid in transmitting RF energy into the ground, for example for use in ground penetrating radar. Preferably, the floating ground element is positioned between the antenna element and the grounding element along the entire surface area of said antenna element.

Preferably, the floating ground element is electrically connected to ground at frequencies below the one or more communications frequencies, preferably using an active or passive communications filter. Preferably, the floating ground element is electrically connected to electrical ground using a passive low-pass, preferably an inductor, whereby low frequencies within the floating ground element are grounded through the inductor. This embodiment is preferred, as it will provide protection against lightning and other dielectric breakdowns. Preferably, the communications filter is a low pass filter with a passband of frequencies less than about 500 kHz lower than the lowest communications frequency. Preferably, the communications filter has an impedance to ground of approximately 0.1 ohm at the low frequencies (preferably frequencies less than about 500 kHz lower than the lowest communications frequency). Preferably, at the one or more communications frequencies, the communications filter has at least 100 ohms impedance to allow the floating ground to float above ground potential, thereby effectively acting as a reflector of RF energy emitted by the antenna element.

In an alternate embodiment, the floating ground element is electrically insulated from ground at all frequencies. In this embodiment, a grounding rod (electrically insulated from the floating ground element) is preferably used to prevent the lightning and other dielectric breakdowns on the floating ground element. In yet another embodiment, the floating ground element is electrically connected to ground via an electrical resistor, whereby various electrical charges on the floating ground element are eventually discharged.

Preferably, the floating ground element is a wire, chain, cable, or other flexible conductor. In a preferred embodiment, the floating ground element is a wire made of a metal.

Grounding Element

The grounding element is earth-ground or anything electrically connected to earth-ground at the one or more communications frequencies. In a preferred embodiment, the grounding element is simply the earth (earth-ground). In an alternate embodiment, the grounding element is an electrically conductive element electrically connected to the earth (e.g. via one or more electrically conductive stakes).

Electrical Ground

Electrical ground is any electrically conductive material connected to one or more electrical components as ground. Preferably, the electrical ground is the earth, or an electrical conductor connected to the earth. In an alternate embodiment, the electrical ground is one or more components of a vehicle, preferably the frame or outer covering of a vehicle.

One or more Electrical Insulators

The one or more electrical insulators (separating the floating ground element and the grounding element and the floating ground element from the antenna and the grounding element) are made of a material that resists the flow of electric charge. Preferably, the electrical resistance of the one or more electrical insulators is maximized. More preferably, the electrical resistance of the one or more electrical insulators is maximized at the one or more communications frequencies. In a preferred embodiment, the one or more electrical insulators are made of air, glass, plastics, polymers, ceramics, wood-based products, and combinations thereof. In a preferred embodiment, the one or more electrical insulators comprise air and various insulating connectors made out of an insulating material.

FIG. 1

FIG. 1 is a side view of one embodiment of an electrically floating, near vertical incident, Skywave (NVIS) Antenna. As shown in FIG. 1, an Electrically Floating, Near Vertical Incidence, Skywave (NVIS) Antenna 1 comprising an antenna element 3, a floating ground element 5, and a grounding element 7.

The floating ground element 5 is electrically insulated from the grounding element 7 and electrical ground (preferably the earth) at least at one or more communications frequencies. The grounding element 7 is electrically connected to electrical ground at least at one or more communications frequencies, more preferably connected to the earth. The floating ground element 5 is positioned between the antenna element 3 and the grounding element 7. The antenna element 3 is separated from the floating ground element 5 by one or more first electrical insulators 9. The floating ground element 5 is separated from the grounding element 7 by one or more second electrical insulators 11.

The floating ground element 5 preferably has a surface area greater than the surface area of the antenna element 3. The floating ground element 5 having a surface area greater than the surface area of the antenna element 3 is a preferred embodiment, which aids in reflecting the RF energy into the sky, thereby increasing the gain over floating ground element 5 lengths equal to or less than the length of the antenna element 3. Preferably, the floating ground element 5 is a wire running the entire length of the antenna element 3 and extending outward further from the antenna element 3.

In the alternative, the floating ground element 5 is designed to have a resonant frequency equal to or higher than the antenna element, thereby allowing the floating ground element aid in transmitting RF energy into the ground, for example for use in ground penetrating radar. In one such embodiment, the floating ground element 5 has a surface area less than the antenna element 3.

The communication electronics 13 is electrically connected to the antenna element 3 via one or more antenna wires 15. Preferably, the one or more first electrical insulators 9 is ambient air and the one or more second electrical insulators 11 is ambient air and the floating ground element 5, the grounding element 7 are all supported by one or more structural supports, not shown for simplicity. In an alternate embodiment, the one or more first electrical insulators 9 and the one or more second electrical insulators 11 are made of a solid or a confined liquid (e.g. a sealed container) and provide as the one or more structural supports.

Communications Electronics 13

Communication electronics 13 are electrically connected to the antenna element 3 via one or more antenna wires 15. The communication electronics 13 produce an electrical signal, for example, an AM (Amplitude Modulation) or FM (Frequency Modulations based signal, at one or more communications frequencies. Preferably, the one or more communications frequencies are between 1-60 Mhz. In a preferred embodiment, the Communication electronics 13 is a skywave transmitter/receiver transmitting and receiving with a communications frequency between 1-60 Mhz.

Preferably, the communication electronics 13 are a self contained computer operated device preferably comprising a transmitter/receiver. Preferably the communications electronics 13 also comprises a tuner/coupler, which matches the impedance of the antenna element 3, which may include high and complex impedance, to the impedance of the transmitter/receiver of the communications electronics 13, preferably 50 ohms. Preferably, the communication electronics 13 include one or more tuner/coupler to prevent line losses, particularly due to mismatched impedance. In a preferred embodiment, a tuner/coupler is positioned as close to the antenna element 3 as possible. Preferably, a tuner/coupler is electrically grounded to the floating ground element 5. Preferably, the communication electronics 13 are attached to the antenna element 3 as close as possible to limit line losses, or interference.

FIG. 2

Figure 2:
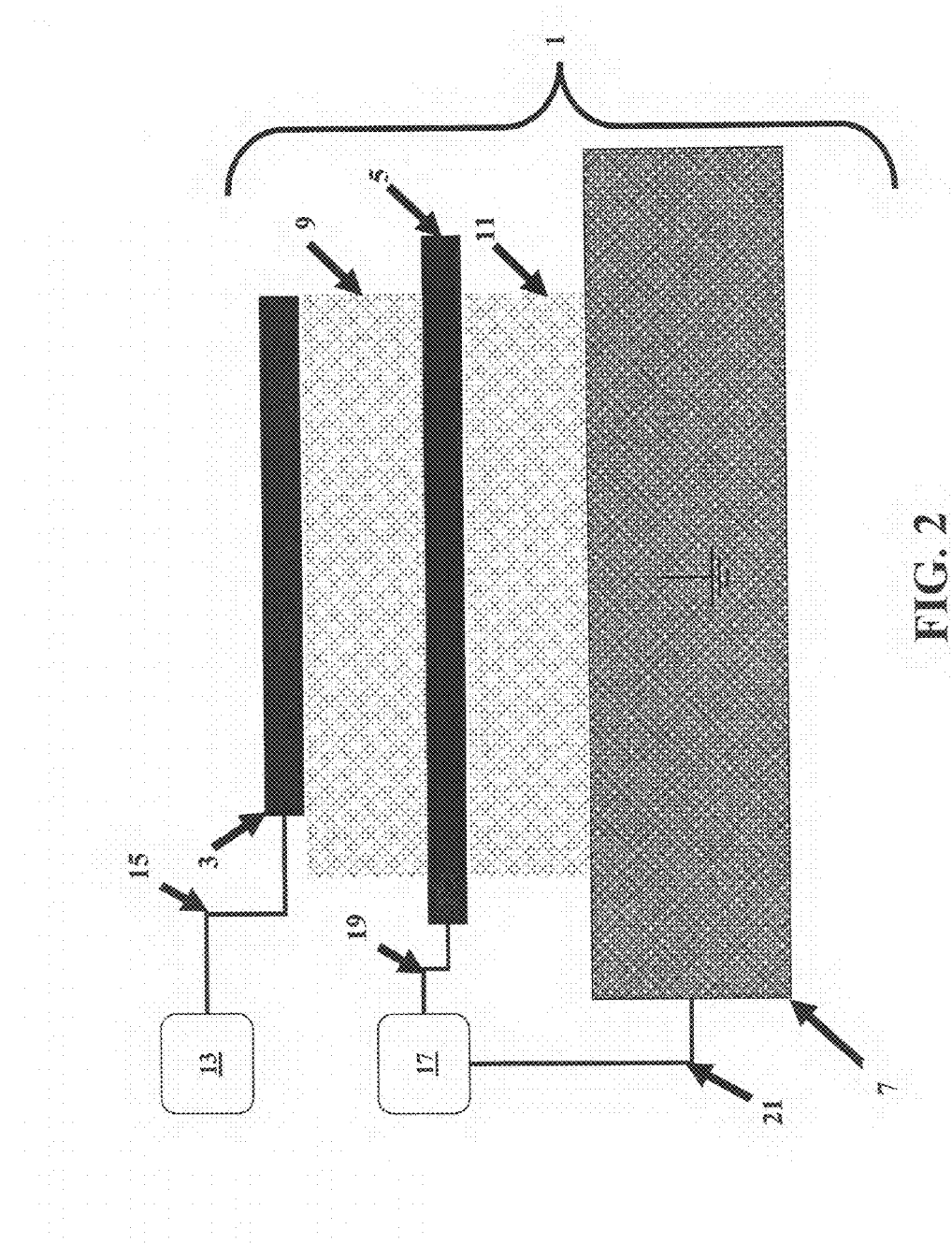
FIG. 2 is a side view of one embodiment of an electrically floating, near vertical incident, Skywave (NVIS) Antenna further comprising a communications filter electrically connecting the floating grounding element to ground frequencies other than the one or more communications frequencies.

FIG. 2 is a side view of one embodiment of an electrically floating, near vertical incident, Skywave (NVIS) Antenna. As shown in FIG. 2, an Electrically Floating, Near Vertical Incidence, Skywave (NVIS) Antenna 1 comprising an antenna element 3, a floating ground element 5, and a grounding element 7.

FIG. 2 further comprises communication electronics 13 and a communications filter 17. The communications filter 17 is electrically connected to the floating grounding element 7 via one or more floating ground wires 19 and the grounding element 5 via one or more grounding wires 21.

Communications Filter 17

The communications filter 17 is any means to electrically connect the floating grounding element 5 to ground frequencies other than the one or more communications frequencies. The communications filter 17 is electrically connected to the floating grounding element 7 via one or more floating ground wires 19 and the grounding element 5 via one or more grounding wires 21. In one embodiment the communications filter 17 is an electrical coil. In a preferred embodiment, the communications filter 17 is wire wrapped around a support tower (see FIG. 4).

FIG. 3

Figure 3:
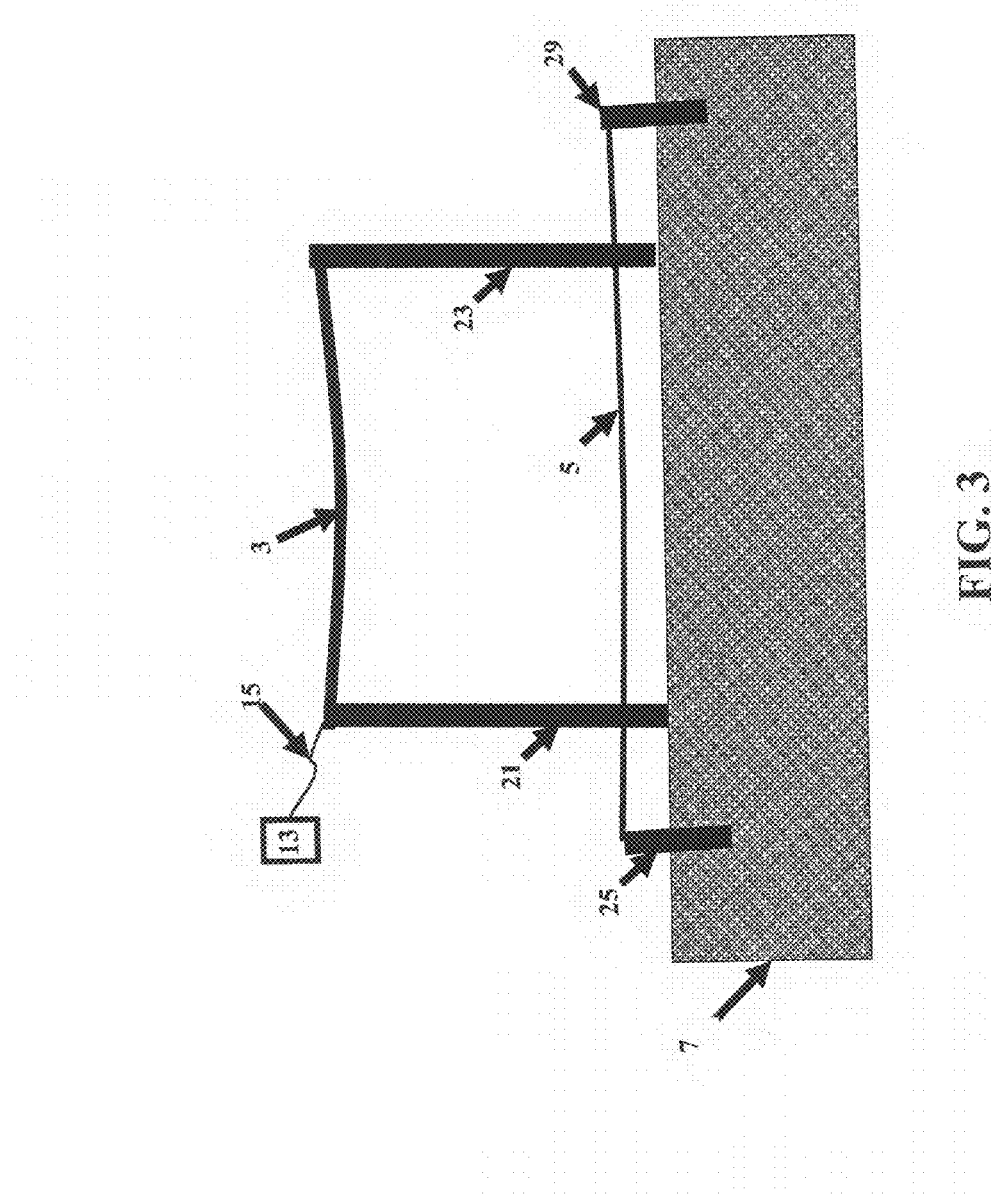
FIG. 3 is a side view of a one embodiment of an electrically floating, near vertical incident, Skywave (NVIS) Antenna.

FIG. 3 is a side view of a one embodiment of an electrically floating, near vertical incident, Skywave (NVIS) Antenna. FIG. 3 depicts an Electrically Floating, Near Vertical Incidence, Skywave (NVIS) Antenna comprising an antenna element 3, a feedpoint tower 21, a support tower 23, a floating ground element 5, a first stake 25, a second stake 29 and a grounding element 7, as described above. Preferably, one or more guy wires, not shown for simplicity, are used to provide structural support for the feedpoint tower 21, the support tower 23, or a combination thereof.

In this embodiment, the antenna element 3 is preferably a wire. Likewise, in this embodiment, the floating element 5 is preferably a wire.

In order to prevent the grounding of the floating ground element 5, the floating ground element 5 is preferably connected to the first stake 25 and the second stake 29 via one or more electrically insulating materials. In an alternative embodiment, the first stake 25 and the second stake 29 are made of an electrically insulating material.

The communication electronics 13 are electrically connected to the antenna element 3 via one or more antenna wires 15, as described above. Preferably, the communication electronics 13 includes one or more tuner/coupler to prevent line losses, particularly due to mismatched impedance. In a preferred embodiment, a tuner/coupler is positioned as close to the antenna element 3 as possible and matches the impedance of the receiver/transmitter portion of the communication electronics 13, which is preferably 50 ohms non-reactive, to the impedance of the one or more antenna wires 15, which may include a high and complex impedance.

In one embodiment, a tuner/coupler is connected to the communications electronics 13 and the antenna element 3. Preferably, the tuner/coupler is electrically grounded to the floating ground element 5. Electrically grounding the tuner/coupler to the floating ground element 5 is preferred as the floating ground element 5 will form a virtual ground thereby optimizing the radiated field pattern of the antenna element 3 away from earth ground. Preferably, the communication electronics 13 are attached to the antenna element 3 as close as possible to limit line losses, or interference.

In embodiments employing a tuner/coupler, the tuner/coupler used is preferably positioned nearby the floating ground element 5, which effectively act as a virtual ground. Positioning the tuner/coupler near, preferably within three inches of, will reduce any changes in the radiated field pattern of the antenna element 3 away from earth ground. In the embodiment shown in FIG. 3, the tuner/coupler is preferably positioned nearby, more preferably within three inches of, the floating ground element 5.

FIG. 4

Figure 4:
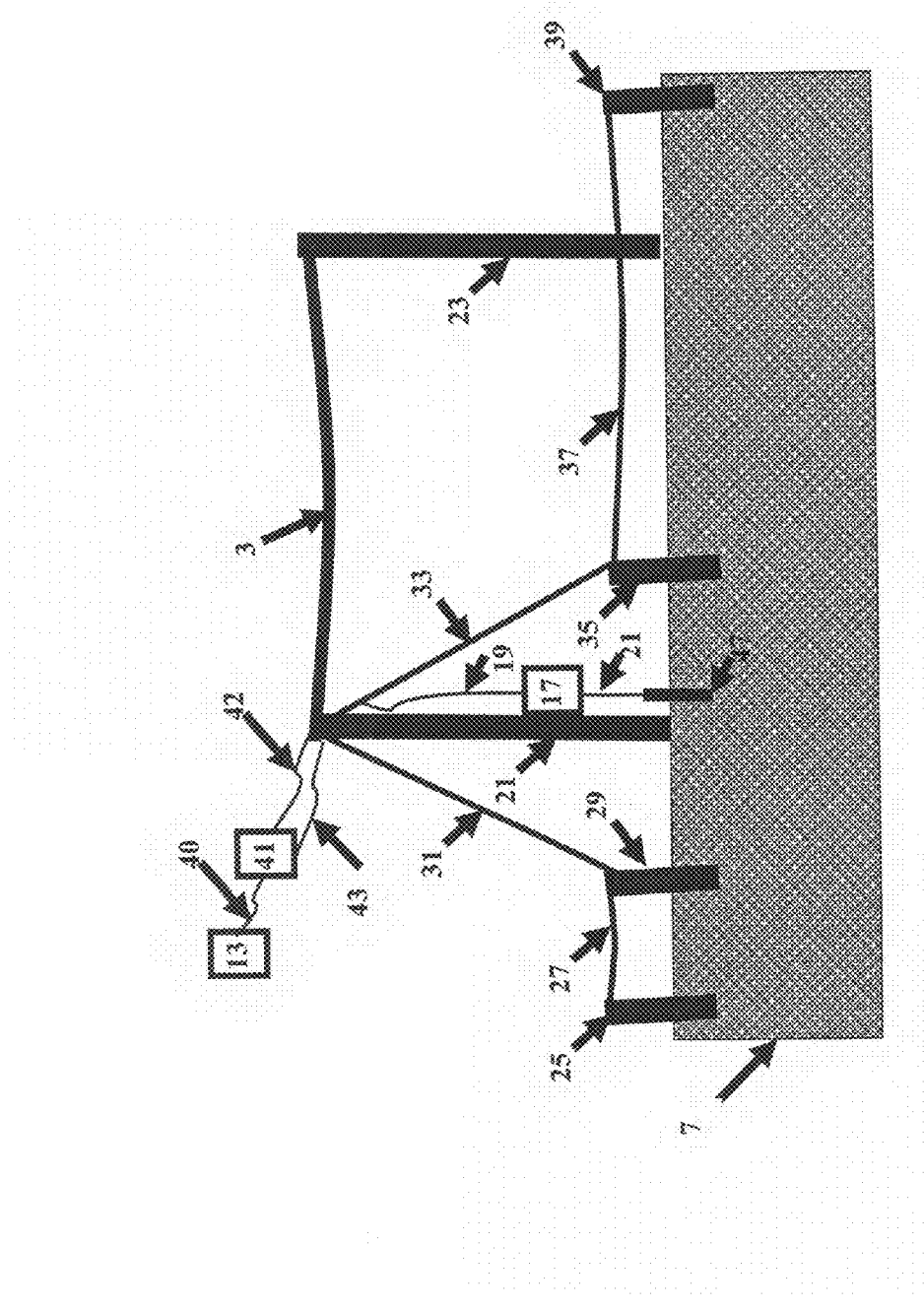
FIG. 4 is a side view of a preferred embodiment of an electrically floating, near vertical incident, Skywave (NVIS) Antenna.

FIG. 4 is a side view of a preferred embodiment of an electrically floating, near vertical incident, Skywave (NVIS) Antenna. FIG. 4 depicts an Electrically Floating, Near Vertical Incidence, Skywave (NVIS) Antenna comprising an antenna element 3, a feedpoint tower 21, a support tower 23, a first stake 25, a first floating ground segment 27, a second stake 29, a second floating ground segment 31, a third floating ground segment 33, a third stake 35, a fourth floating ground segment 37, a fourth stake 39, and a grounding element 7. In this embodiment, the first floating ground segment 27, second floating ground segment 31, third floating ground segment 33, fourth floating ground segment 37 provide as the floating ground element (Reference 5 in FIG. 1-3) as described above. Preferably, one or more guy wires, not shown for simplicity, are used to provide structural support for the support tower 23. In this embodiment, communication electronics 13 are electrically connected to a tuner/coupler 41 via a wire 40. The tuner/coupler 41 is electrically connected to the antenna element 3 via a wire 42. The tuner/coupler 41 is also connected to the floating ground element, preferably the second floating ground segment 31, the third floating ground segment 33, or a combination thereof, via a wire 43.

Each of the first floating ground segment 27, second floating ground segment 31, third floating ground segment 33, fourth floating ground segment 37 are electrically conductive and electrically insulated from ground at least at one or more communications frequencies, preferably electrically insulated from ground at frequencies between 1-60 Mhz. In this embodiment, the second floating ground segment 31 and the third floating ground segment 33 provide structural support for the feedpoint tower 21, as well as a floating ground element. Therefore, the second floating ground segment 31 and the third floating ground segment 33 connect securely to the feedpoint tower 21, preferably towards the top of the feedpoint tower 21 and to the earth via the second stake 29 and the third stake 35, respectively. In order to prevent the grounding of the second floating ground segment 31 and the third floating ground segment 33, the second floating ground segment 31 and the third floating ground segment 33 are preferably connected to the second stake 29 and the third stake 35 via one or more electrically insulating materials. In an alternative embodiment, the second stake 29 and the third stake 35 are made of an electrically insulating material. This embodiment is preferred as it has been found that the gain of the antenna increases if the structural support, preferably guy wires, are electrically conductive and provide as a floating ground element.

Each of the floating ground elements (first floating ground segment 27, second floating ground segment 31, third floating ground segment 33, and fourth floating ground segment 37) are electrically conductive and electrically insulated from ground at least at one or more communications frequencies, preferably electrically insulated from ground at frequencies between 1-60 Mhz. Preferably, this is accomplished by electrically connecting the first floating ground segment 27, second floating ground segment 31, third floating ground segment 33, fourth floating ground segment 37, or a combination thereof to a communications filter electrically connected to ground. As shown in FIG. 4, preferably, a communications filter 17 is electrically connected to the third floating ground segment 33 via one or more floating ground wires 19 (although one or more of the other floating ground elements may also be used in addition to or as a substitute for). The communications filter 17 is also electrically connected to the grounding element 7 via one or more grounding wires 21 and preferably a grounding rod 47. The grounding rod 47 is any electrically conductive material capable of being connected to the grounding element 7, preferably a metal rod.

The communication electronics 13 are electrically connected to the antenna element 3 via one or more antenna wires 15, as described above. Preferably, the communication electronics 13 includes one or more tuner/coupler to prevent line losses, particularly due to mismatched impedance. In a preferred embodiment, a tuner/coupler is positioned as close to the antenna element 3 as possible and matches the impedance of the receiver/transmitter portion of the communication electronics 13, which is preferably 50 ohms non-reactive, to the impedance of the one or more antenna wires 15, which may include a high and complex impedance.

Preferably, a tuner/coupler 41 is positioned nearby the floating ground elements, which effectively act as a virtual ground. Positioning the tuner/coupler 41 near, preferably within three inches of, will reduce any changes in the radiated field pattern of the antenna element 3 away from earth ground. In the embodiment shown in FIG. 4, the tuner/coupler 41 is preferably positioned nearby, more preferably within three inches of, the second floating ground segment 31 or the third floating ground segment 33.

The communications filter 17 is any means to electrically connect the floating grounding elements (first floating ground segment 27, second floating ground segment 31, third floating ground segment 33, and fourth floating ground segment 37) ground frequencies other than the one or more communications frequencies, as described above. Preferably, the communications filter 17 is an electrical coil. In a preferred embodiment, the communications filter 17 is an insulated wire wrapped around the base of the feedpoint tower 21, preferably at least five times.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C.§112, ¶ 6. In particular, the use of "step of" in the claims herein is not intended to invoke the provisions of 35 U.S.C.§112, ¶ 6.

The invention claimed is:

1. A skywave antenna comprising:
   a. an antenna element, a floating ground element, a grounding element;
   b. said ground element electrically connected to electrical ground at least at one or more communications frequencies; said floating ground element electrically insulated from electrical ground at least at said one or more communications frequencies;
   c. at least part of said floating ground element positioned between said antenna element and said grounding element;
   d. said antenna element separated from said floating ground element and said grounding element by one or more electrical insulators; and
   e. said floating ground element separated from said antenna element and said grounding element by one or more electrical insulators;
   f. said floating ground element electrically connected to ground via a communications filter.

2. The skywave antenna of claim 1 further comprising:
   a. said antenna element comprising a surface area; and
   b. said floating ground element between said antenna element and said grounding element along the entire surface area of said antenna element.

3. The skywave antenna of claim 1 further comprising:
   a. said antenna element comprising a surface area;
   b. said floating ground element comprising a surface area;
   c. said floating ground element between said antenna element and said grounding element along the entire said surface area of said antenna element; and
   d. said surface area of said floating ground element greater than said surface area of said antenna element.

4. The skywave antenna of claim 3 further comprising:
   a. communications electronics;
   b. said communications electronics comprising a transmitter/receiver;
   c. said transmitter/receiver electrically connected to said antenna element; and
   d. said transmitter/receiver communicating at a communications frequency between 1-60 Mhz.

5. The skywave antenna of claim 4 further comprising:
   a. said grounding element comprising earth.

6. The skywave antenna of claim 5 further comprising:
   a. a tuner/coupler electrically connecting said communications electronics to said antenna element; and
   b. said tuner/coupler electrically connected to said floating ground element.

7. The skywave antenna of claim 6 further comprising:
   a. said communications filter comprising:
      i. an electrical inductor electrically connected to electrical ground and said floating ground element.

8. The skywave antenna of claim 7 further comprising:
   a. a feedpoint tower, a support tower;
   b. said feedpoint tower positioned at a distance from said support tower;
   c. said antenna element comprising an antenna wire connected to said feedpoint tower and said support tower; and
   d. said floating ground element comprising a floating ground wire.

9. The skywave antenna of claim 8 further comprising:
   a. said floating ground wire about parallel to said antenna wire.

10. The skywave antenna of claim 1 further comprising:
    a. communications electronics;
    b. said communications electronics comprising a transmitter receiver;
    c. said transmitter/receiver electrically connected to said antenna element; and d. said transmitter/receiver communicating at a communications frequency between 1-60 Mhz.

11. The skywave antenna of claim 10 further comprising:
a. a tuner/coupler electrically connecting said communications electronics to said antenna element; and
b. said tuner/coupler electrically connected to said floating ground element.

12. The skywave antenna of claim 11 further comprising:
a. said tuner/coupler positioned within 3 inches of said antenna element.

13. The skywave antenna of claim 1 further comprising:
a. said communications filter comprising:
i. an electrical inductor electrically connected to electrical ground and said floating ground element.

14. The skywave antenna of claim 1 further comprising:
a. said grounding element comprising earth.

15. A skywave antenna comprising:
a. an antenna element, a floating ground element, a grounding element;
b. said ground element electrically connected to electrical ground at least at one or more communications frequencies; said floating ground element electrically insulated from electrical ground at least at said one or more communications frequencies;
c. at least part of said floating ground element positioned between said antenna element and said grounding element;
d. said antenna element separated from said floating ground element and said grounding element one or more electrical insulators; and
e. said floating ground element separated from said antenna element and said grounding element by one or more electrical insulators;
f. a feedpoint tower, a support tower;
g. said feedpoint tower positioned at a distance from said support tower;
h. said antenna element comprising an antenna wire connected to said feedpoint tower and said support tower; and
i. floating ground element comprising a floating ground wire.

16. The skywave antenna of claim 15 further comprising:
a. said grounding element comprising earth.

17. The skywave antenna of claim 15 further comprising:
a. said floating ground wire about parallel to said antenna wire.

* * * * *